United States Patent

White, Jr. et al.

[11] Patent Number: 5,944,342
[45] Date of Patent: Aug. 31, 1999

[54] AIR BAG WITH INFLATOR SHIELD

[75] Inventors: Michael J. White, Jr., Shelby Township; Mark O. Olson, Farmington Hills, both of Mich.

[73] Assignee: TRW Vehicle Safety Systems Inc., Lyndhurst, Ohio

[21] Appl. No.: 08/953,807

[22] Filed: Oct. 21, 1997

[51] Int. Cl.[6] .................................................. B60R 21/24
[52] U.S. Cl. ...................................... 280/729; 280/743.1
[58] Field of Search ............................... 280/729, 743.1, 280/730.2, 731, 732

[56] References Cited

U.S. PATENT DOCUMENTS

| 3,767,225 | 10/1973 | Mazelsky | 280/729 |
| 3,814,458 | 6/1974 | Acs | 280/729 |
| 3,843,151 | 10/1974 | Lewis | 280/729 |

FOREIGN PATENT DOCUMENTS

| 2152635 | 4/1973 | Germany | 280/729 |
| 314646 | 12/1989 | Japan | 280/729 |

*Primary Examiner*—Christopher P. Ellis
*Attorney, Agent, or Firm*—Tarolli, Sundheim, Covell, Tummino & Szabo

[57] ABSTRACT

An air bag module (10) includes an inflatable vehicle occupant protection device (30) comprising a main panel (50) which has a deflated condition and which is inflatable into a position adjacent to an occupant for helping to protect the occupant. The module (10) also includes an inflator assembly (32, 34) actuatable to provide inflation fluid for inflating the main panel (50) of the inflatable device (30). The inflator assembly (32, 34) has at least one fluid outlet (36) disposed within the main panel (50) for directing inflation fluid from the inflator assembly into the main panel. The inflatable device (30) also includes a shield (60) disposed within the main panel (50). The shield (60) overlies the fluid outlet (36) when the inflatable device (30) is in the deflated condition. The shield (60) is rupturable at a predetermined weakened portion (152) in response to the flow of inflation fluid from the fluid outlet (36) to enable flow of inflation fluid into the main panel (50) of the inflatable device (30). The shield (60) blocks contact between the initial flow of inflation fluid, which may contain hot particles, and the main panel (50).

8 Claims, 6 Drawing Sheets

AIR BAG WITH INFLATOR SHIELD

BACKGROUND OF THE INVENTION

1. Technical Field

The present invention relates to a vehicle safety apparatus and, in particular, relates to an air bag module including an inflatable vehicle occupant protection device, such as an air bag, for helping to protect a vehicle occupant in the event of an impact to the vehicle.

2. Description of the Prior Art

It is known to inflate an air bag to help protect a vehicle occupant in the event of a side impact to a vehicle of a magnitude above a predetermined threshold. The air bag is stored in a deflated condition, together with an inflator, in a portion of the vehicle such as a vehicle seat. The vehicle seat is disposed adjacent to side structure of the vehicle, such as a door, window, or body panel of the vehicle. In the event of an impact, such as a side impact, to the vehicle of a magnitude above the predetermined threshold, the inflator is actuated and emits inflation fluid which inflates the air bag. The air bag is inflated into a position between the vehicle occupant in the vehicle seat and the adjacent side structure of the vehicle. The air bag helps protect the vehicle occupant from being forcefully struck by parts of the side structure of the vehicle. The air bag can also help protect the vehicle occupant from objects, such as a pole or a tree, which might intrude into the vehicle during the side impact.

Some air bag inflators produce inflation fluid through combustion of a pyrotechnic material. The combustion products in the initial flow of inflation fluid from the inflator may include hot particulate matter which might cause damage to the material of the air bag. It is desirable to prevent such damage from occurring.

SUMMARY OF THE INVENTION

The present invention is a vehicle safety apparatus for helping to protect an occupant of a vehicle. The apparatus comprises an inflatable vehicle occupant protection device. The inflatable device comprises a main body portion which has a deflated condition and which is inflatable into a position adjacent to the occupant for helping to protect the occupant. The apparatus also includes an inflator assembly actuatable to provide inflation fluid for inflating the main body portion of the inflatable device. The inflator assembly has at least one fluid outlet disposed within the main body portion of the inflatable device for directing inflation fluid from the inflator assembly into the main body portion of the inflatable device. The inflatable device includes a shield disposed within the main body portion. The shield overlies the fluid outlet when the inflatable device is in the deflated condition. The shield has a predetermined weakened portion and is rupturable at the predetermined weakened portion in response to the flow of inflation fluid from the fluid outlet to enable flow of inflation fluid into the main body portion of the inflatable device.

BRIEF DESCRIPTION OF THE DRAWINGS

The foregoing and other features of the present invention will become apparent to one skilled in the art to which the present invention relates upon consideration of the following description of the invention with reference to the accompanying drawings, wherein.

DESCRIPTION OF A PREFERRED EMBODIMENT

Figure 1:
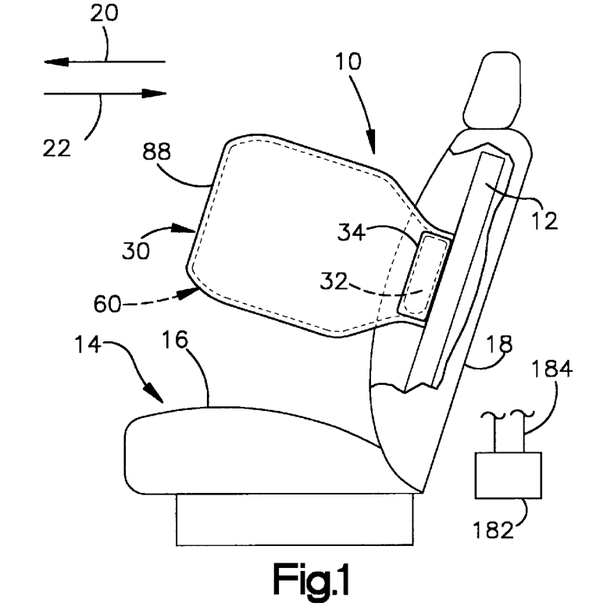
FIG. 1 is a schematic side elevational view of a vehicle seat and an air bag module constructed in accordance with the present invention, showing the air bag in an inflated condition.

The present invention relates to a vehicle safety apparatus and, in particular, relates to an air bag module including an inflatable vehicle occupant protection device, such as an air bag, for helping to protect a vehicle occupant in the event of a side impact to the vehicle. The present invention is applicable to various vehicle safety apparatus constructions. As representative of the present invention, FIG. 1 illustrates schematically a vehicle safety apparatus or air bag module 10.

The air bag module 10 is connected with a seat frame member 12 of a seat 14 for an occupant of a vehicle. The seat 14 includes a seat bottom cushion 16 and a seat back 18 connected with the seat bottom cushion. The seat frame member 12 is disposed in the seat back 18. A forward direction in the vehicle is indicated by the arrow 20 (FIG. 1) and a rearward direction in the vehicle is indicated by the arrow 22.

The air bag module 10 includes a particular type of inflatable device 30 which is commonly known as an air bag. The air bag 30 is described below in detail. The air bag module 10 also includes an inflator indicated schematically at 32 (FIGS. 1, and 11–13). The inflator 32 uses the combustion of a pyrotechnic material to generate inflation fluid in the form of gas to inflate the air bag 30.

The air bag module 10 also includes a tubular diffuser 34 which receives the inflator 32. The inflator 32 is fixedly secured in the diffuser 34 in a manner not shown. The diffuser 34 is made from metal and has an elongate, cylindrical configuration. A series of fluid outlets 36 (FIG. 13) are formed in the diffuser 34 for directing inflation fluid to flow from the inflator 32 into the air bag 30. The fluid outlets 36 are arranged in a straight line which extends parallel to an axis 38 (FIGS. 7 and 13) of the module 10. A plurality of mounting bolts 40 extend radially outward from the diffuser 34 opposite the outlets 36.

The air bag 30 is preferably made from a fabric material, such as woven nylon. The air bag 30 can alternatively be made from a non-woven material, such as plastic film. The use of plastic film, in particular, would require one or more inflation fluid vents to be formed in the air bag 30, as is known in the art.

Figure 2:
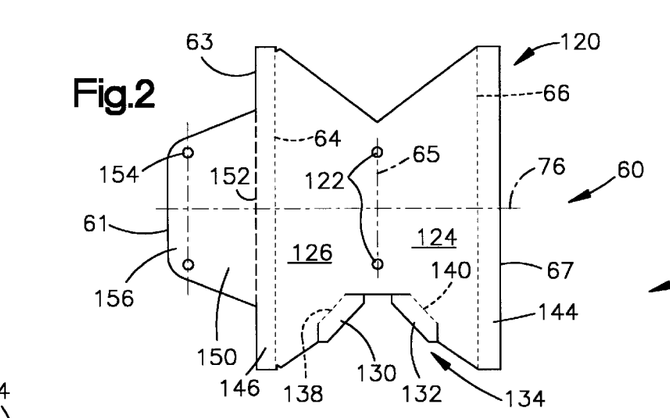
FIG. 2 is an elevational view of a reinforced panel or shield which forms a part of the air bag of FIG. 1.

The air bag 30 is formed from two separate material panels, that is, a main panel 50 (FIG. 3) and a reinforcement panel or shield 60 (FIG. 2). The main panel 50 and the shield 60 are sewn together in a manner described below to form the air bag 30. The main panel 50 is inflatable into a position between the vehicle occupant and the side structure of the vehicle.

The main panel 50 (FIG. 3) includes a main body portion 72 and a retainer portion 74 located on opposite sides of an imaginary line 54. The imaginary line 54 extends perpendicular to a longitudinal axis 76 of the air bag 30. The main panel 50, as illustrated, is made as one piece, but could be alternatively made from a plurality of pieces of material joined together to form the main panel.

The main body portion 72 of the main panel 50 has an elongate configuration and is generally symmetrical about a fold line 55. A first section 78 of the main body portion 72 extends from the fold line 55 in a direction away from the retainer portion 74 (to the right as viewed in FIG. 3). A second section 86 of the main body portion 72 extends between the fold line 55 and the retainer portion 74 of the main panel 50.

Figure 3:
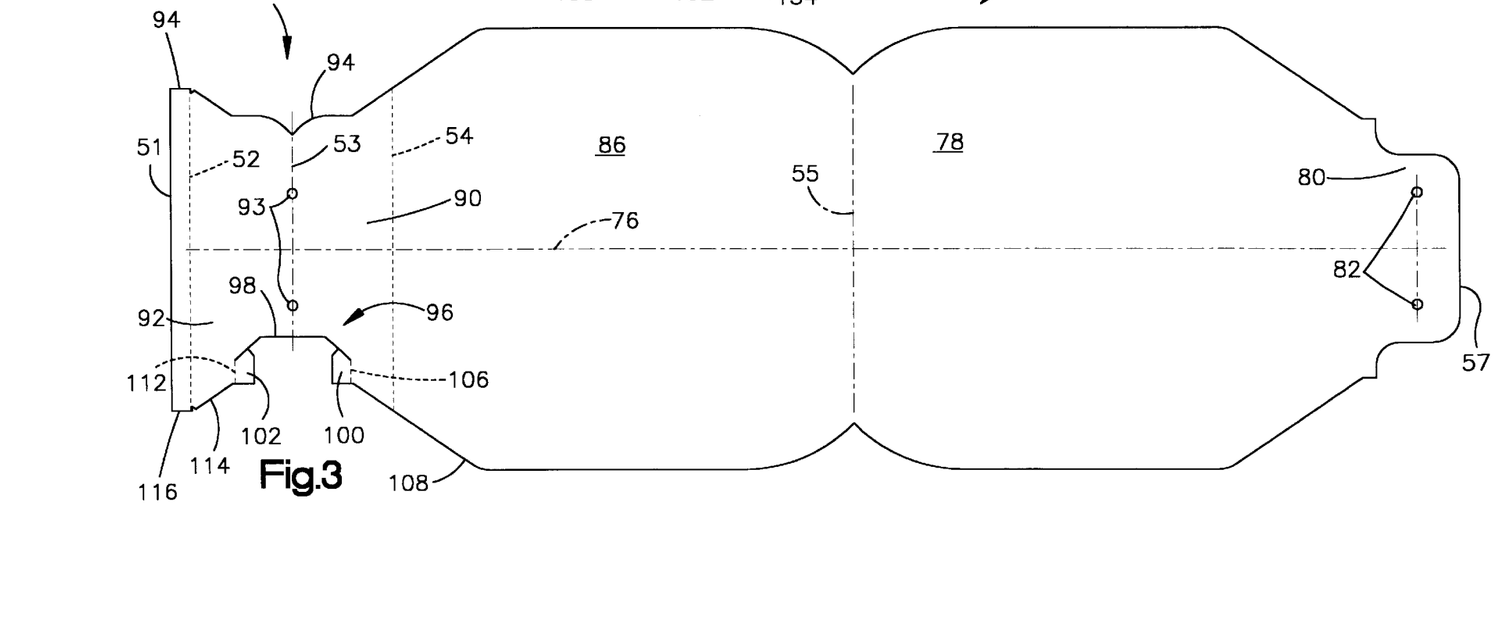
FIG. 3 is an elevational view of a main panel which forms a part of the air bag of FIG. 1.

An outer flap 80 of the air bag 30 projects from the first section 78 of the main body portion. The outer flap 80 has an end edge 57 which forms a first terminal end of the main panel 50. Two fastener openings 82 are formed in the outer flap 80.

The retainer portion 74 of the main panel 50 extends from the second section 86 of the main body portion 72, in a direction to the left as viewed in FIG. 3. The retainer portion 74 is generally symmetrical about a centerline 53 extending perpendicular to the longitudinal axis 76. A first section 90 of the retainer portion 74 is located between the centerline 53 and the line 54. A second section 92 of the retainer portion 74 extends between the centerline 53 and an end edge 51 of the retainer portion which forms a second terminal end of the main panel 50. Two fastener openings 93 in the retainer portion 74 are disposed on the centerline 53.

The retainer portion 74 of the main panel 50 has upper and lower (as viewed in FIG. 3) side edges 94 and 96, respectively. The lower side edge 96 includes a linear, axially extending edge portion 98 centered on the centerline 53. A pair of tabs 100 and 102 are formed on the lower side edge 96 of the retainer portion 74. The tab 100 is foldably connected with the retainer portion 74 at a fold line 106, and is located near a lower side edge 108 of the second section 86 of the main body portion 72. The tab 102 is foldably connected with the retainer portion 74 at a fold line 112.

The shield 60 (FIG. 2) is generally similar in size and shape to the retainer portion 74 of the main panel 50. The shield 60 includes a main body portion 120 which is symmetrical about a centerline 65. Two fastener openings 122 extend through the shield 60 along the centerline 65.

First and second sections 124 and 126 of the main body portion 120 extend in opposite directions from the centerline 65. The first section 124 extends from the centerline 65 to a terminal end edge 67 of the shield. The second section 126 extends from the centerline 65 to an opposite end edge 63 of the main body portion 120 of the shield.

An inner flap 150 of the air bag 30 projects from the second section 126 of the main body portion 120 of the shield 60, along the edge 63. The inner flap 150 is connected with the main body portion 120 of the shield along a tear line or predetermined weakened portion 152 of the shield. The inner flap 150 has an end edge 61 which forms a terminal end edge of the shield 60. Two fastener openings 154 extend through the inner flap 150.

A pair of tabs 130 and 132 are formed on a lower edge 134 of the main body portion 120 of the shield 60. The tabs 130 and 132 are located on opposite sides of the centerline 65. The tab 130 is foldably connected with the second section 126 of the shield 60 at a fold line 138. The tab 132 is foldably connected with the first section 124 of the shield 60 at a fold line 140.

Figure 4:
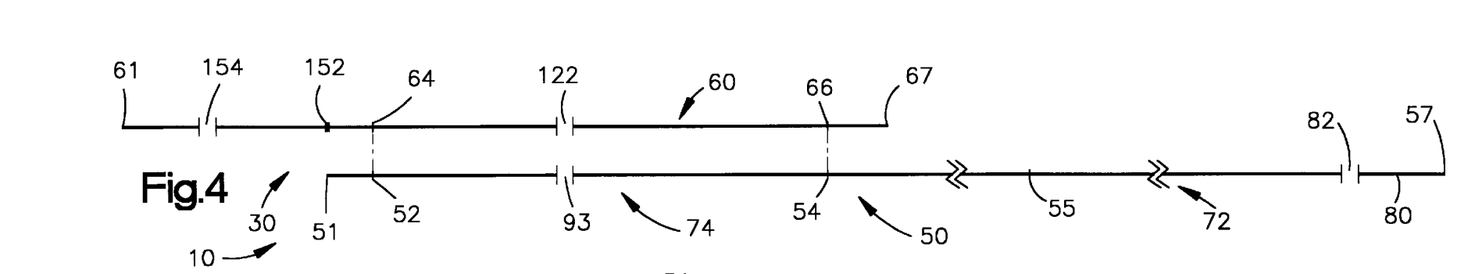
FIGS. 4–11 are a series of schematic views showing the air bag of FIG. 1 in a series of successive positions of assembly.

During assembly of the air bag 30, the main panel 50 and the shield 60 are placed in an overlying relationship and then sewn together, as described below. FIG. 4 shows an initial step in the assembly process, viewed with the shield 60 overlying the retainer portion 74 of the main panel 50. The fastener openings 122 in the shield 60 overlie the fastener openings 93 in the retainer portion 74 of the main panel 50. The tear line 152 on the shield 60 overlies the terminal end edge 51 of the main panel 50.

The shield 60 is sewn to the main panel 50 at two, spaced apart locations. Specifically, the shield 60 is sewn to the main panel with a linear first stitching section (not shown) extending along a line 64 on the shield 60 and along a line 52 on the main panel 50. Another linear stitching section 158 (FIG. 13) extends through the shield 60 along a line 66 and through the main panel 50 along the line 54.

Figure 14:
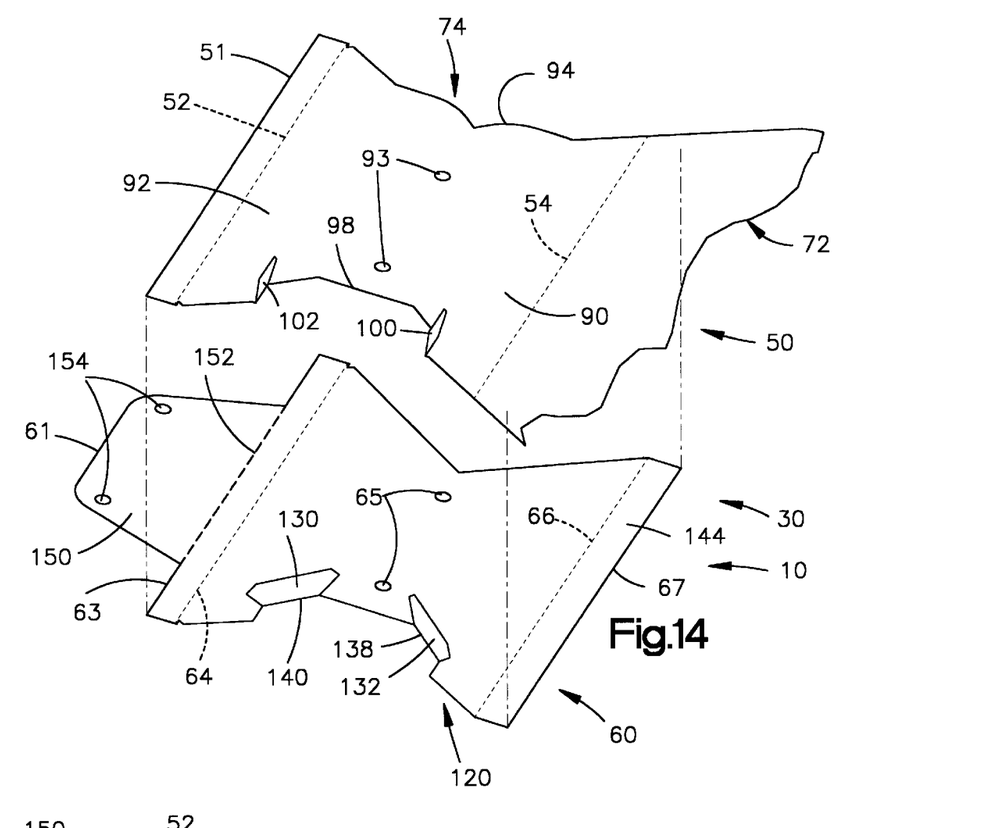
FIGS. 14 and 15 are perspective views showing in more detail one assembly step.
Figure 15:
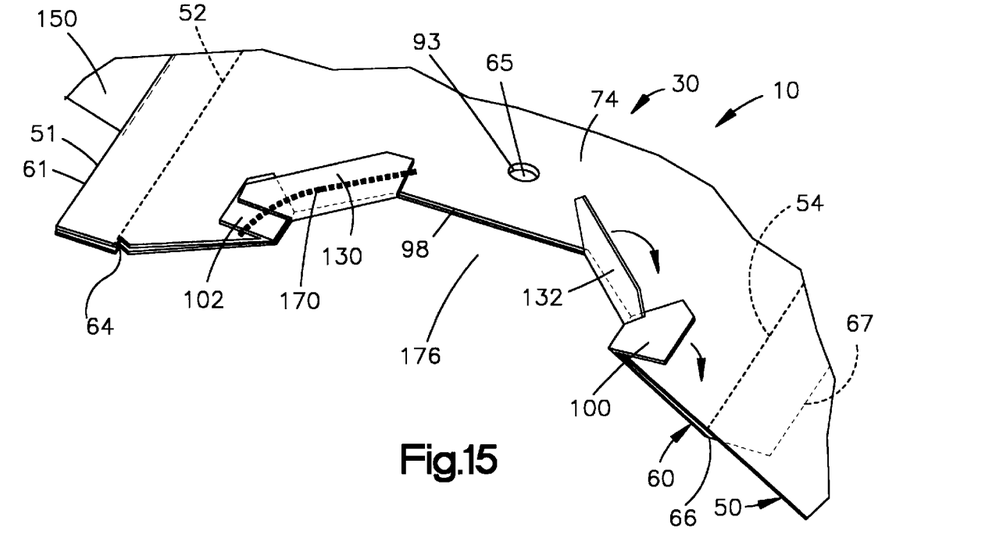

In the next step of the assembly process, the tabs 130 and 132 on the shield 60 (FIGS. 14 and 15) are folded back toward the main body portion 120 of the shield. (FIGS. 14 and 15 show the panels 50 and 60 as viewed in a direction looking from the main panel down toward the shield panel.) The shield tabs 130 and 132 when thus folded push the main panel tabs 100 and 102 into a position overlying the retainer portion 74 of the main panel.

Figure 13:
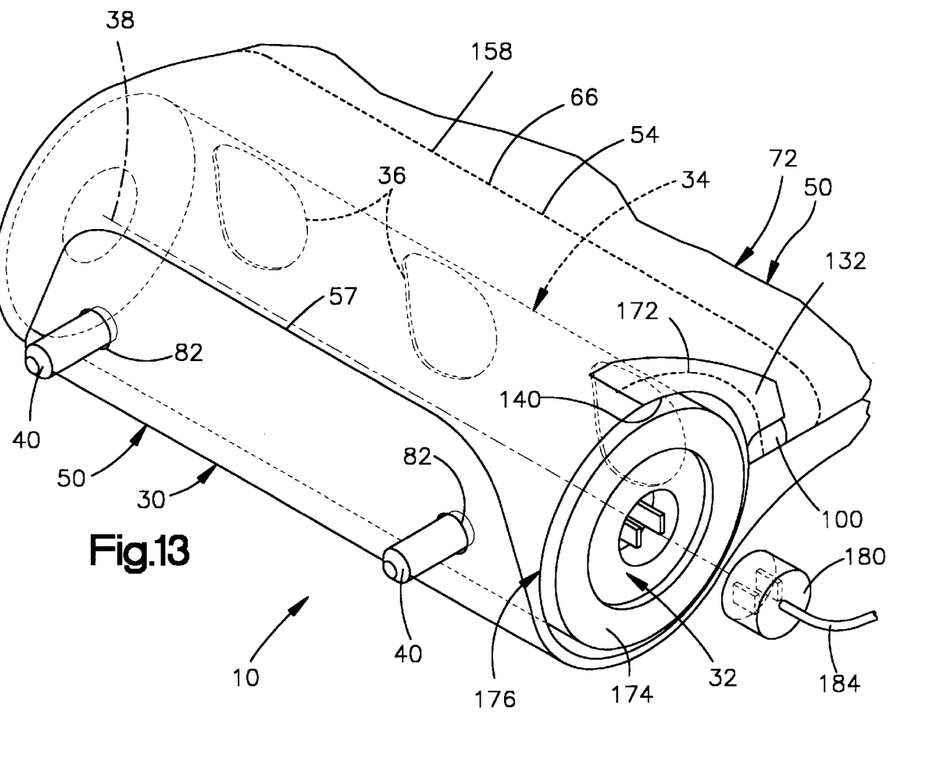
FIG. 13 is a partial perspective view of the air bag module.

The tabs 102 and 130 are sewn flat with a stitching section 170 which extends through (from top to bottom as viewed in FIG. 15) the shield tab 130, the main panel tab 102, the retainer portion 74 of the main panel 50, and the main body portion 120 of the shield 60. In a similar manner, the tabs 132 and 100 are sewn flat to the shield 60 and the main panel 50 with a stitching section 172 (FIG. 13).

Figure 5:
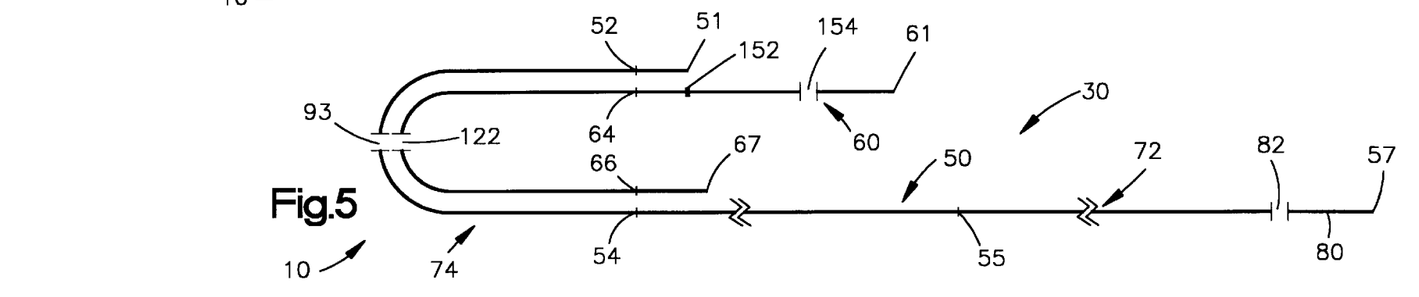

In the next step of the assembly process, the shield 60 and the retainer portion 74 of the main panel 50 are folded about their respective centerlines 65 and 53, from the condition shown in FIG. 4 to the condition shown in FIG. 5. The perimeters of the shield panel 60 and the retainer portion 74 of the main panel 50 are then sewn together. The main body portion 72 of the main panel 50 is next folded about the fold line 55, from the condition shown in FIG. 5 to the condition shown in FIG. 6, so that the second section 86 of the main body portion overlies the first section 78.

Figure 6:
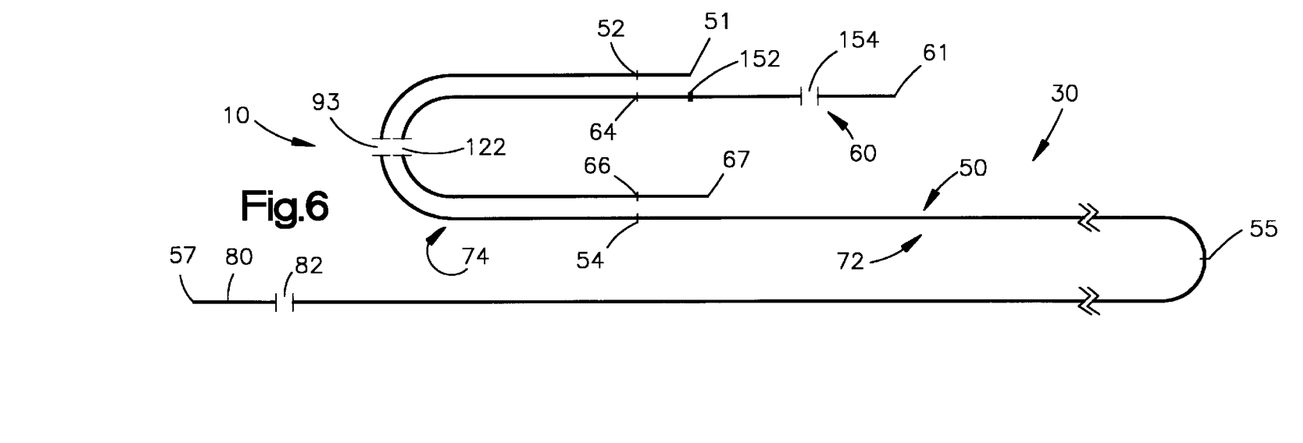

The two side edges of the air bag 30 (above and below the plane of the paper as viewed in FIG. 6) are then sewn closed with stitching sections (not shown) which extend in a direction from right to left as viewed in FIG. 6, from the fold line 55 past the line of the fastener openings 93 in the main panel. The stitching sections extend through both the main panel 50 and the shield panel 60. The outer flap 80 of the main panel 50 is not sewn, and an opening is thus formed in the air bag at the location of the outer flap (above the outer flap as viewed in FIG. 6).

Figure 7:
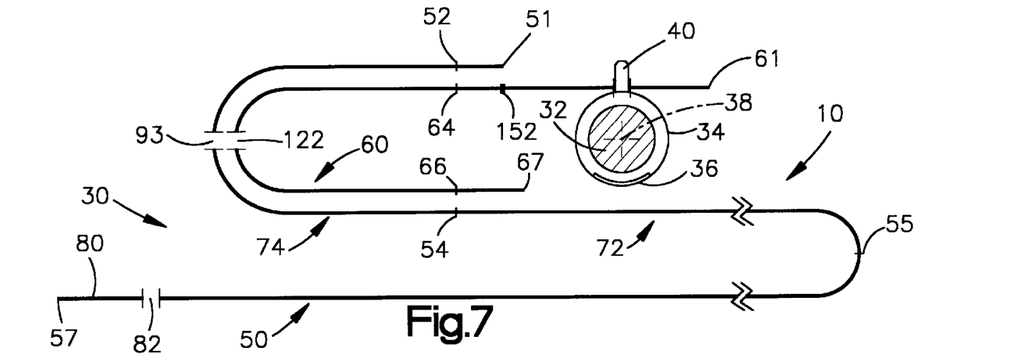
Figure 8:
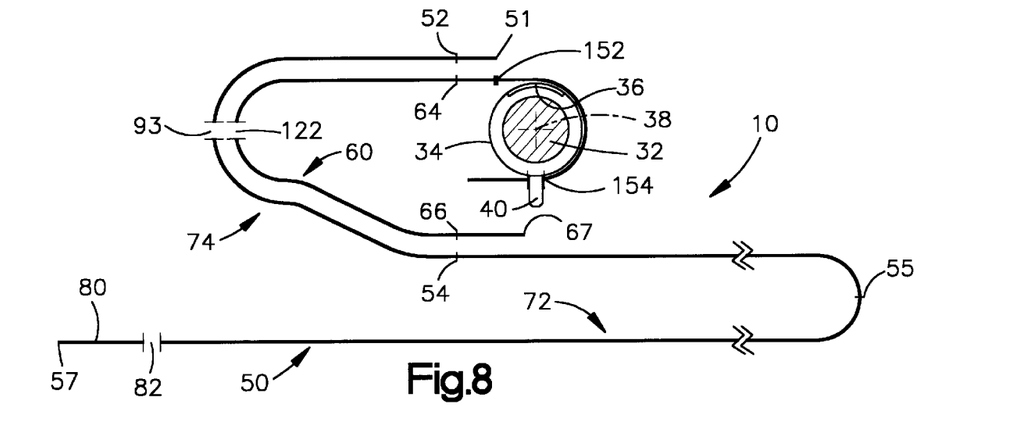

The assembly of the diffuser 34 and the inflator 32 is then joined with the air bag 30. The mounting bolts 40 on the diffuser 34 are inserted through the fastener openings 154 in the shield 60, as shown in FIG. 7. The diffuser 34 is rotated approximately 270 degrees, through the position shown in FIG. 8 in which the shield 60 wraps partially around the diffuser 34, to the position shown in FIG. 9 in which the shield is wrapped completely around the diffuser. The diffuser 34 and the inflator 32 are, thereby, enclosed in a pocket formed by the shield 60 and the retainer portion 74 of the main panel 50.

The mounting bolts 40 on the diffuser 34, at this point in the assembly process, extend through three layers of fabric material of the air bag 30. Specifically, the mounting bolts 40 on the diffuser 34 extend through the fastener openings 154 in the outer flap 150 of the shield 60 through the fastener openings 122 in the main body portion 120 of the shield and through the fastener openings 93 in the retainer portion 74 of the main panel 50.

Figure 9:
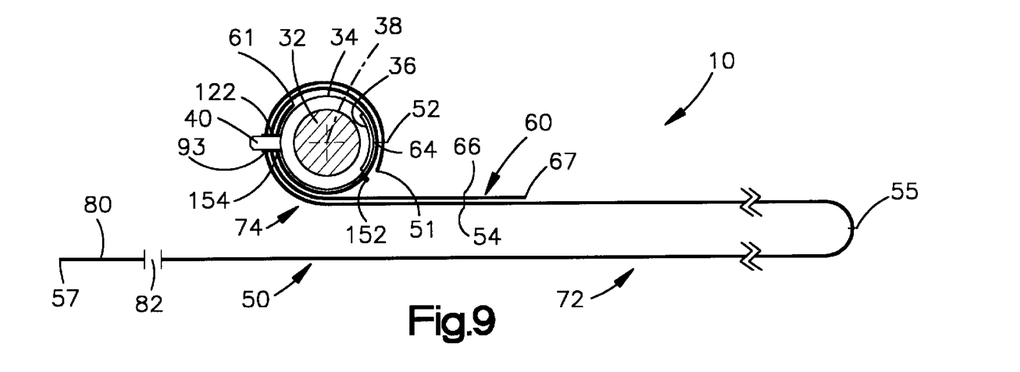
Figure 10:
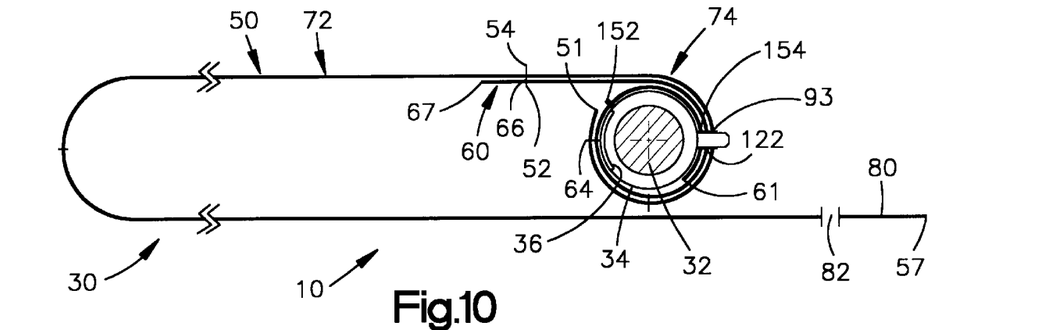

The sewn air bag 30 is next inverted, from the condition shown in FIG. 9 to the condition shown in FIG. 10, by reaching in above the outer flap 80 in a direction from left to right as viewed in FIG. 9, and pulling the air bag at the location of the fold line 55 back out through the opening above the outer flap. This inversion process places the selvage of the sewn edges inside the completed air bag 30 and away from the vehicle occupant when the air bag is inflated. The outer flap 80 of the air bag 30 is then folded over as shown in FIG. 11, so that the mounting bolts 40 in the diffuser 34 extend through the fastener openings 82 in the outer flap.

Figure 11:
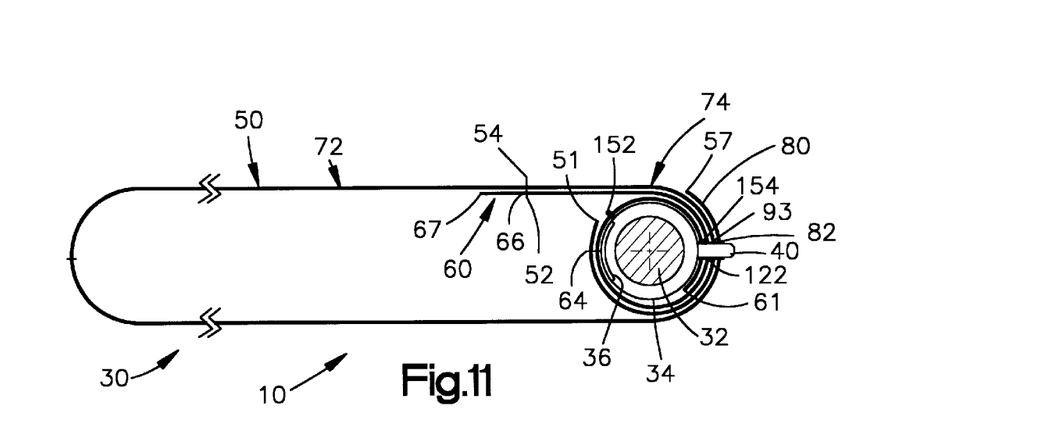

When the air bag module 10 is in the condition shown in FIG. 11, the shield 60 is wrapped completely around the diffuser 34, inside the main panel 50. The tear line 152 is adjacent to and, preferably, overlies the inflation fluid outlets 36 in the diffuser 34. The end edge 51 of the main panel 50 is adjacent to and overlies the inflation fluid outlets 36.

The air bag 30, as thus formed, has an opening 176 (FIG. 13) through which an end portion 174 of the inflator 32 is exposed. The opening 176 is adjacent to the folded and sewn tabs 100 and 132 and the folded and sewn tabs 102 and 130. An electrical connector 180 is connected with the inflator 32 through the opening 176 in the air bag 30. The portions of the air bag 30 which define the opening 176 are multiple layers of fabric and include the fold lines 138 and 140 for the shield tabs 130 and 132. As a result, the air bag 30 has a strong, well-defined edge at the opening 176, to minimize fraying and to facilitate assembly of the module 10.

The air bag 30 is folded in a known manner (not shown), and the assembled air bag module 10 is enclosed with a suitable wrap or cover (also not shown). The air bag module 10 is secured by the mounting bolts 40 to the seat frame member 12 (FIG. 1) in the seat back 18. The air bag module 10 when mounted in the seat 14 is enclosed by the seat covering material of the seat and, possibly, by foam cushion material of the seat back 18.

The vehicle in which the air bag module 10 is mounted includes known means indicated schematically at 182 (FIG. 1) for sensing a side impact to the vehicle and for actuating the inflator 32 in response to the sensing of a side impact. The means 182 may include a side impact sensor, such as a deceleration sensor, and vehicle circuitry for electrically actuating the inflator 32 in response to sensing a side impact to the vehicle greater than a predetermined threshold value for which inflation of the air bag 30 is desired to help protect the vehicle occupant. The means 182 is electrically connected with the inflator 32, via lead wires 184 from the electrical connector 180, for providing an actuation signal to the inflator.

In the event of a side impact to the vehicle of a magnitude greater than the predetermined threshold value, the inflator 32 is actuated by the means 182. Inflation fluid flows out of the inflator 32 and into the diffuser 34. The inflation fluid flows out of the diffuser 34 through the openings 36 in the diffuser.

The inflation fluid contacts the shield 60, which is wrapped around the diffuser 34. Fluid pressure builds up inside the shield 60. The shield 60 remains unruptured at the tear line 152 for a brief period of time, about 1 to 3 milliseconds. During this initial time period, the initial flow of inflation fluid from the inflator 32 is contacting the material of the shield 60, and is blocked from contacting the main panel 50 of the air bag 30.

The tear line 152 is configured so that it ruptures a predetermined period of time after actuation of the inflator 32. The predetermined time period is preferably about 1 to 3 milliseconds. The predetermined time period is selected so that there is normally little, if any, hot particulate matter in the inflation fluid being produced after the predetermined time period. As a result, most of the particles which may be present in the initial flow of inflation fluid from the inflator 32, and which may be hot enough to burn or otherwise damage the fabric material of the air bag 30, contact the shield 60 and do not come into contact with the main panel 50 of the air bag.

Figure 12:
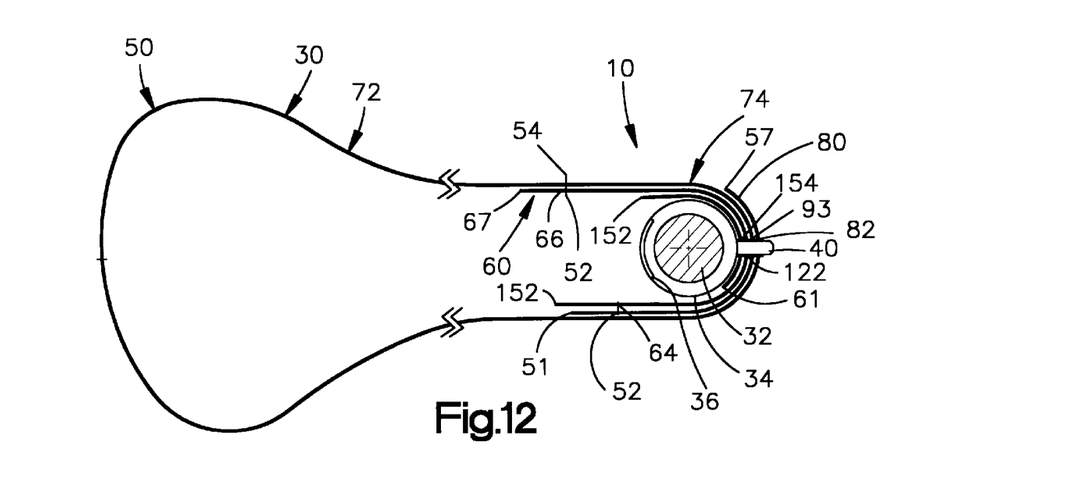
FIG. 12 is a schematic view similar to FIGS. 4–11 and showing the air bag being inflated.

The shield 60 ruptures at the tear line 152, as shown in FIG. 12, when the fluid pressure inside the shield 60 is sufficient, and/or when the force of the inflation fluid striking the shield is sufficient. The rupturing of the shield 60 enables inflation fluid from the diffuser 34 to flow into the main body portion 72 of the main panel 50 of the air bag 30. The inflation fluid which flows into the main body portion 72 of the air bag 30 does not include hot particles which were trapped by the shield 60.

The inflating air bag 30 opens the plastic cover of the module 10 and then cuts through the foam cushion material and the seat covering material of the seat back 18. The air bag 30 inflates from a folded, stored condition to an inflated condition as illustrated in FIG. 1.

From the above description of the invention, those skilled in the art will perceive improvements, changes and modifications in the invention. For example, the present invention is not limited to an air bag module which is mounted on a vehicle seat, and can be used with an air bag module mounted on a vehicle instrument panel, a vehicle steering wheel or door panel, or other portion of the vehicle. Such improvements, changes and modifications within the skill of the art are intended to be covered by the appended claims.

Having described the invention, we claim:

1. A vehicle safety apparatus for helping to protect an occupant of a vehicle, said apparatus comprising:

an inflatable vehicle occupant protection device comprising a main panel which has a deflated condition and which is inflatable into a position adjacent to the occupant for helping to protect the occupant;

an inflator assembly actuatable to provide inflation fluid for inflating said main panel of said inflatable device, said inflator assembly having at least one fluid outlet disposed within said main body portion of said inflatable device for directing inflation fluid from said inflator assembly into said main panel of said inflatable device; and said inflatable device further comprising a shield disposed within said main panel, said shield overlying said fluid outlet when said inflatable device is in the deflated condition;

said shield having a predetermined weakened portion and being rupturable at said predetermined weakened portion in response to the flow of inflation fluid from said fluid outlet to enable flow of inflation fluid into said main panel of said inflatable device;

said shield comprising a fabric material panel sewn to said main panel, said main panel having a retainer portion wrapped around said inflator assembly, said shield being wrapped around said inflator assembly at a location intermediate said inflator assembly and said retainer portion of said main panel.

2. An apparatus as set forth in claim 1 wherein a plurality of fastener openings are formed in each one of said main panel and said shield, said inflator assembly having a plurality of fasteners which extend through said fastener openings in said main panel and in said shield for securing said vehicle safety apparatus in the vehicle.

3. An apparatus as set forth in claim 1 wherein said shield and said main panel each include a plurality of tabs which are folded together to define at least partially an inflator access opening in said inflatable device.

4. An apparatus as set forth in claim 1 wherein said predetermined weakened portion of said shield comprises a tear line which is disposed adjacent to said inflation fluid outlet when said inflatable device is in the deflated condition.

5. An apparatus as set forth in claim 1 wherein said inflatable device has rolled portions defining a pocket in said inflatable device within which said inflator assembly is disposed, said rolled portions comprising said shield and a retainer portion of said main panel.

6. An apparatus as set forth in claim 5 wherein said inflatable device has edge portions defining an opening into said pocket through which an end portion of said inflator is accessible.

7. An apparatus as set forth in claim 1 wherein said shield is rupturable after about 1 to 3 milliseconds under the force of inflation fluid flowing from said fluid outlet.

8. An apparatus as set forth in claim 1 wherein said predetermined weakened portion of said shield is configured to rupture a predetermined period of time after actuation of said inflator assembly.

\* \* \* \* \*